United States Patent [19]

Kiwalle et al.

[11] 4,414,292

[45] Nov. 8, 1983

[54] METAL HALOGEN BATTERY SYSTEM

[75] Inventors: Jozef Kiwalle, West Bloomfield; James H. Galloway, New Baltimore, both of Mich.; John W. Rowan, Stamford, Conn.

[73] Assignee: Energy Development Associates, Inc., Madison Heights, Mich.

[21] Appl. No.: 343,904

[22] Filed: Jan. 29, 1982

[51] Int. Cl.³ .............................................. H01M 8/18
[52] U.S. Cl. ........................................ 429/19; 429/49; 429/64; 429/105; 429/70
[58] Field of Search .................... 429/19, 17, 101, 105, 429/50, 51, 63, 64, 49, 70, 80

[56] References Cited

U.S. PATENT DOCUMENTS

| | | | |
|---|---|---|---|
| 3,713,888 | 1/1973 | Symons | 136/6 |
| 3,993,502 | 11/1976 | Bjorkman, Jr. | 429/51 |
| 4,001,036 | 1/1977 | Berman et al. | 429/67 |
| 4,072,540 | 2/1978 | Symons et al. | 429/70 |
| 4,146,680 | 3/1979 | Carr | 429/51 |

*Primary Examiner*—Charles F. LeFevour
*Attorney, Agent, or Firm*—Harness, Dickey & Pierce

[57] ABSTRACT

A metal halogen battery construction, with the improved combination comprising, at least one cell having a positive electrode and a negative electrode for contact with aqueous electrolyte containing the material of said metal and halogen, sump means wherein the electrolyte is collected, store means wherein halogen hydrate is formed and stored as part of an aqueous material, circulation means for transmitting electrolyte through the battery, conduit means for transmitting halogen gas formed in the cell to hydrate forming means associated with the store means, fluid jet pump means operative to cause circulation of gases from the sump including hydrogen and halogen to contact a reactor means whereby hydrogen and halogen are combined and returned to the sump, and valve means sensitive to gas pressure in the sump means whereby when sump pressure drops below a desired setting of said valve means, the valve opens and permits halogen gas from the store to be transmitted to the electrolyte circulation means.

10 Claims, 3 Drawing Figures

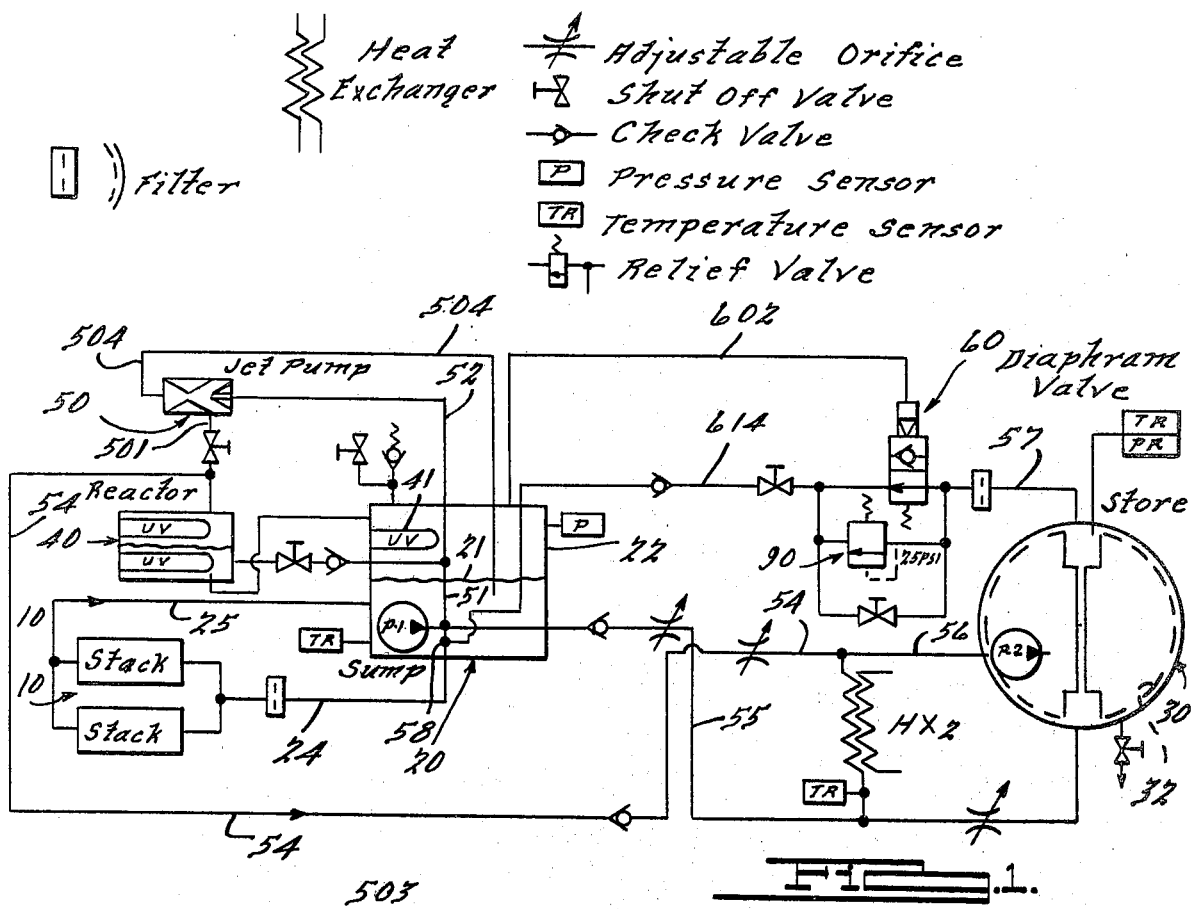
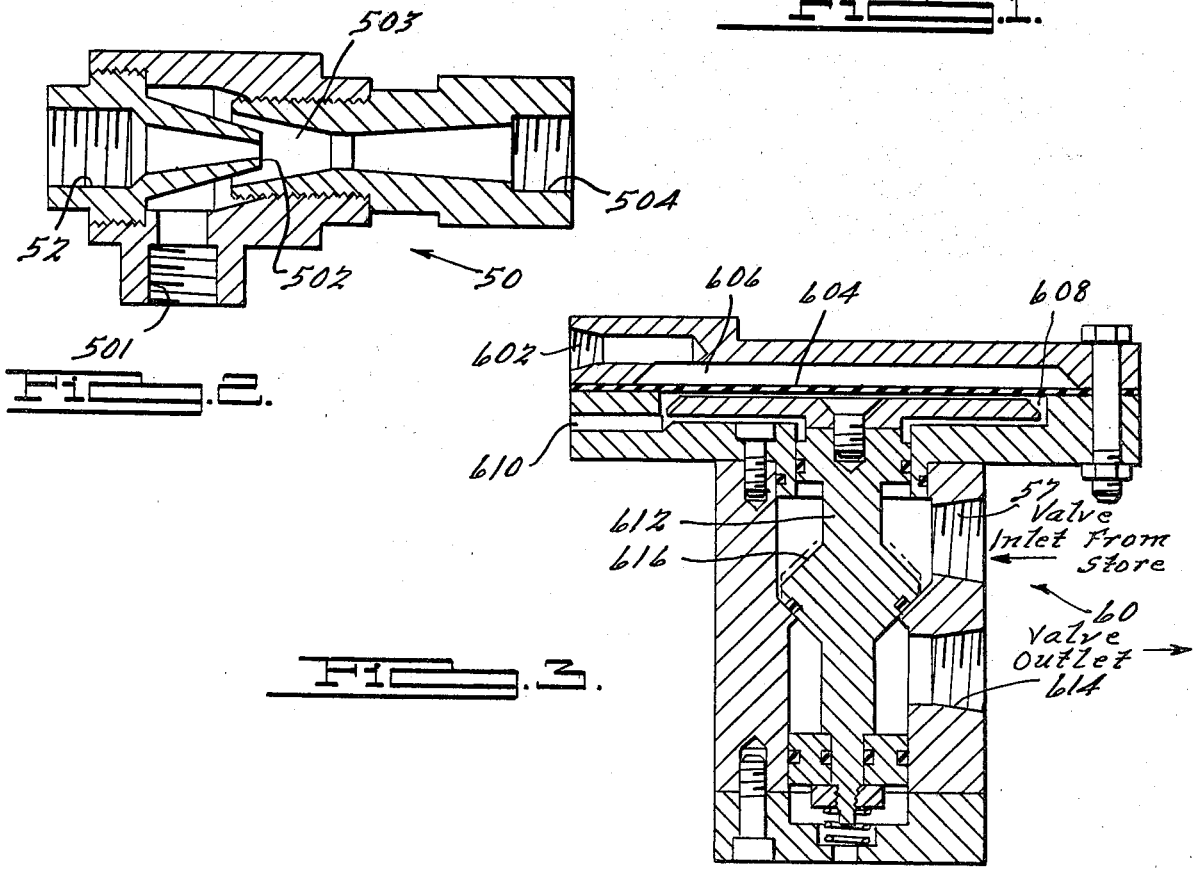

METAL HALOGEN BATTERY SYSTEM

BACKGROUND OF THE INVENTION

The present invention relates to improvements in metal halogen battery systems. More particularly the invention relates to a new zinc-chloride battery system. The invention herein is particularly useful for mobile battery applications, e.g., for electric vehicles.

The electrical energy storage systems of the type referred to herein (e.g., a zinc-chlorine battery system) utilize a halogen hydrate as the source of a halogen component for reduction at a normally positive electrode, and an oxidizable metal adapted to become oxidized at a normally negative electrode during the normal discharge of the storage system. An aqueous electrolyte is employed for replenishing the supply of the halogen component as it becomes reduced at the positive electrode. The electrolyte contains the dissolved ions of the oxidized metal and the reduced halogen and is circulated between the electrode area and a storage area containing halogen hydrate which progressively decomposes during a normal discharge of the electrical energy system, liberating additional elemental halogen to be consumed at the positive electrode. Electrical energy storage systems or battery systems of this type are described in prior patents owned by the same assignee as the present invention such as U.S. Pat. Nos. 3,713,888, 3,993,502, 4,001,036, 4,072,540 and 4,146,680. Such systems are also described in published reports prepared by the assignee herein, such as "Zinc-Chloride Electric Engine Unit for Four Passenger Electric Vehicle" by J. Kiwalle and J. Galloway of Energy Development Associates, and EPRI Report EM-1051 (Parts 1-3) dated April 1979, published by the Electric Power Research Institute. The specific teachings of the aforementioned cited references are incorporated herein by reference.

The basic operation of a zinc-chloride battery system is as follows. In charge, an electrolyte pump delivers aqueous electrolyte to pockets between pairs of porous graphite-chlorine electrodes in a battery stack. The electrolyte passes through the porous chlorine electrodes into a chamber between opposite polarity electrodes, flows up between the electrodes, then flows back into the battery sump. Chlorine gas liberated from porous graphite electrolyte substrates is pumped by a gas pump, and before entering the gas pump, the chlorine is mixed with electrolyte chilled by a chiller unit. The chlorine and chilled electrolyte are mixed in the gas pump, chlorine hydrate forms, and the chlorine hydrate-electrolyte mixture is deposited in the store. In discharge, chlorine is liberated from hydrate by decomposition of chlorine hydrate in the store by injection of warm electrolyte from the sump. On development of the required chlorine gas pressure in the store, the chlorine is injected and mixed with and dissolved in the electrolyte, which is then fed to the porous electrodes in the battery stack. The battery stack is then discharged, wherein electrode dissolution of zinc occurs at the zinc electrode, reduction of the dissolved chlorine occurs at the chlorine electrode, power is available from the battery terminals, and zinc chloride is formed in the electrolyte by reaction of zinc and chlorine to form zinc chloride.

There have been certain weaknesses or disadvantages in prior experimental systems directed towards a metal halogen battery system for mobile applications. For example, power dissipation has occurred in such systems because it was necessary to run the gas pump essentially continuously during discharge. Secondly, the pressure differential between the store and the sump was set by a pressure differential valve, which meant that if the store pressure changed, then sump pressure would follow, whereas sump pressure should normally be kept close to atmospheric pressure.

Accordingly it is the main object of this invention to provide a novel and unique metal halogen battery system for mobile applications. Other objects, features, and advantages of the invention will become apparent from the description herein, from the drawings which show preferred embodiments, and from the appended claims.

BRIEF DESCRIPTION OF THE DRAWINGS

FIG. 1 illustrates a schematic of the battery system in accordance with the invention herein.

FIG. 2 illustrates an embodiment of a jet pump for use in the system of FIG. 1; and, FIG. 3 illustrates a special valve means used in the system of FIG. 1.

SUMMARY OF THE INVENTION

The invention herein is concerned with a novel metal halogen battery system, for example of the zinc-chloride type, which utilizes a special jet pump device for circulation of hydrogen and chlorine gases through a reaction chamber associated with the system; and, the battery system also includes a special pressure sensitive valve or diaphragm valve which uniquely controls the distribution of chlorine from the battery store to the stack.

DESCRIPTION OF PREFERRED EMBODIMENTS

The drawing FIG. 1 illustrates a schematic of a zinc-chlorine battery system wherein means are provided to achieve the desired flows of chlorine, electrolyte, and heat. The zinc-chloride battery consists of three basic parts, the stack, the sump, and the store, as shown in FIG. 1. The stack 10 consists of a plurality of cells made up, for example, of solid-graphite zinc electrodes and porous-graphite chlorine electrodes. Each cell has the potential of two volts (thus giving a stack arrangement with 60 cells a 120-volt potential). The sump means is designated 20 and is comprised of an electrolyte reservoir 22 and the electrolyte pump P-1 to circulate the electrolyte 21. The store means is designated 30 and contains a gas pump P-2 and a filter means 32. The store functions to store the chlorine reactant in the form of chlorine hydrate, which is a brilliant yellow solid that decomposes to chlorine gas and electrolyte at temperatures above 9.6° C. at ambient atmospheric pressure.

The centrifugal pump P-1 circulates the electrolyte 21 from the reservoir 22 to the individual porous electrodes (not shown) in the stack through the conduit 24, from which electrolyte returns to the reservoir through the conduit 25. The small quantity of hydrogen evolved during battery operation is combined with the chlorine in an ultraviolet light-activated reactor designated 40 to form hydrogen chloride, which is subsequently returned to the electrolyte reservoir as will be described herein.

As shown, there are two locations of ultraviolet lights, one inside the reservoir gas space indicated at 41, with the U.V. light 41 being activated during charge only; and, two more U.V. lights inside reactor 40 which are activated both during charge and discharge of the battery. In order to generate suction within the reactor 40 necessary to induce flow of gas from reservoir 22 into the reactor 40 and back into reservoir 22, a jet pump construction designated 50 is employed. A small quantity of electrolyte from electrolyte pump P-1 is diverted into the jet pump 50 through the conduits 51,52 to act as a driving force for the jet pump. The jet pump 50 is also shown in more detail in FIG. 2. When the electrolyte pump P-1 is in operation, the stream of liquid electrolyte passing through the jet pump from conduit 52 causes a suction whereby the gases from the reservoir 22 and from the upper part of the reactor 40 are drawn into the jet pump through the conduit 501, and the gases are then mixed in with the liquid stream exiting from the nozzle 502 near the point 503. Thereafter the intermixture of gas and liquid is returned to the sump 20 via the conduit 504.

During charge of the battery system, chlorine is liberated from the porous-graphite chlorine electrode subtrates, while zinc is deposited on the solid-graphite electrodes. The chlorine which is liberated in the stack 10 is subsequently drawn through conduit 54 to the store 30 via the vacuum created by the gas pump P-2 within the store 30. Such reduced pressure operation lowers the concentration of dissolved chlorine in the stack compartment thereby improving coulombic efficiency. The heat exchanger HX-1 operates to provide cooling for the electrolyte in the sump during operation of the battery.

A small amount of electrolyte, from the output of the centrifugal pump P-1, is also diverted through conduit 55 to heat exchanger HX-2 and chilled to approximately 0° C. This chilled electrolyte contacts chlorine gas (via conduit 54) drawn from the stack by the vacuum at the intake 56 to the gas pump P-2, and chlorine hydrate is formed at the outlet port of pump P-2. Hydrate is filtered-out in the store in a fashion similar to a filtering press by the filter means 32.

The formation of chlorine hydrate from the aqueous electrolyte leads to an increasing concentration of zinc chloride within the store 30, and the electrolysis of the zinc chloride in the stack 10 reduces the zinc-chloride concentration in it. Therefore, by interchanging electrolyte between the stack and store, the use of zinc chloride is optimized in the system. The electrolyte interchange between the stack 10 and store 30 is accomplished by pumping warm electrolyte (30° C.) via the centrifugal pump P-1 and conduit 55 from the sump reservoir 22 into the store 30, and returning cold electrolyte (0° C.) through conduit 57 from the store 30 to the stack at point 58 on the high pressure side of pump P-1, and then via conduit 24 to the stack 10. The flow rates of both solutions are approximately equal. If the fluid flow pressure in conduit 57 exceeds approximately 25 psia then the fluid by-passes valve 60 and flows through the relief valve 90 to conduit 614 which leads to the high pressure side of the electrolyte pump P-1 at point 58.

System pressure during charge represents a balance between the rate of chlorine generation and the rate of hydrate formation. Therefore, when the stack pressure increases above a predetermined level, more coolant is required for hydrate formation and vice versa.

During discharge, drop in pressure inside store 30 starts gear pump P-2 injecting warm electrolyte from the reservoir (through pump P-1, conduit 55 and HX-2) until desired store pressure is restored. This action decomposes a portion of the chlorine hydrate within the store, thereby liberating chlorine and increasing the internal pressure in the store. This chlorine is injected into the discharge port of the centrifugal pump P-1 at point 58, and then circulated through the stack. Control is maintained by monitoring the pressure of the store, which indicates the balance between the rate of chlorine consumption in the stack and the rate of chlorine decomposition in the store. This, in turn, is controlled by the rate of injecting warm electrolyte into the store.

The demand for power from the battery can change rapidly but due to the large thermal mass within the store, evolution of chlorine tracks demand only approximately. Therefore a diaphragm operated, 2-position-unidirectional flow valve is utilized as designated at 60 with the valve being normally in the closed position. This pressure sensitive valve 60 is also shown in more detail in FIG. 3. The valve is constructed as variant of spool valve, and it provides for close control of chlorine demand and bubble tight isolation of the store from the stack. A large demand of power from the battery will result in a large demand of chlorine, and this will lower the pressure in the reservoir 22. The reservoir pressure is fed to the valve 60 through the conduit 602. The diaphragm 604 of the valve 60 is acted upon by reservoir pressure on side 606 of the diaphragm, and ambient atmospheric pressure operates against the other side 608, with the side 608 being connected to atmosphere through conduit 610 (FIG. 3). Lowering of the pressure in reservoir 22 below ambient atmospheric pressure causes opening of the valve 60, due to lifting of the diaphragm member 604 which is connected to valve spool 612, and this allows chlorine from the store via conduit 57 to be transmitted through conduit 614 to the discharge side of pump P-1 at point 58. When store pressure exceeds ambient atmospheric pressure, valve 60 shuts tight due to operation of the store fluid pressure on valve surface 616. Further increase of the store pressure shuts the valve 60 tighter.

The valve can also be biased to operate at a pressure higher than ambient atmospheric pressure, so that whole system would work above ambient atmospheric pressure; and for example, this can be done by attaching a suitable spring biasing member to one end of the spool if it is desired to operate the system at higher than ambient atmospheric pressure.

The battery system described herein has been found to work in a very advantageous and satisfactory manner. The novel jet pump technique utilizing aqueous electrolyte to pump gas, as disclosed herein eliminates the need to run the gas pump continuously during the discharge cycle of the battery, and this results in less power dissipation and better battery efficiency. The novel pressure sensitive valve construction disclosed herein can be operated by sump atmospheric pressure against ambient atmospheric pressure, or it can be operated against pressures higher than ambient atmospheric pressure through use of spring biasing, such that the whole system would be workable above ambient atmospheric pressure. This valve construction is highly advantageous in that it provides the capability to isolate the store from the sump, and when sump pressure drops below the setting of the valve, the valve opens and allows chlorine from the store to be discharged into the sump. Upon reaching the valve setting, the valve closes and any increased store pressure shuts the valve tighter.

Usage of this valve has resulted in less power dissipation and increased battery efficiency.

The battery system disclosed herein has been used to power a full size 4-door automobile and it has performed very satisfactorily in numerous miles of test driving.

While it will be apparent that the preferred embodiments of the invention disclosed are well calculated to fulfill the objects, benefits and/or advantages of the invention, it will be appreciated that the invention is susceptible to modification, variation and change without departing from the proper scope or fair meaning of the subjoined claims.

What is claimed is:

1. A metal halogen battery construction, with the improved combination comprising,
   at least one cell having a positive electrode and a negative electrode for contact with aqueous electrolyte containing the material of said metal and halogen,
   sump means wherein the electrolyte is collected,
   store means wherein halogen hydrate is formed and stored as part of an aqueous material,
   circulation means for transmitting electrolyte through the battery,
   conduit means for transmitting halogen gas formed in the cell to hydrate forming means associated with the store means, and
   fluid jet pump means operative to cause circulation of gases from the sump including hydrogen and halogen to contact a reactor means whereby hydrogen and halogen are combined and returned to the sump.

2. The invention of claim 1 wherein,
   said battery is a zinc-chlorine battery using an aqueous zinc-chloride electrolyte.

3. The invention of claim 2, wherein,
   said jet pump means is driven by a relatively high pressure stream of liquid electrolyte which passes through the jet pump and causes said gases to be sucked through the reactor means and then combined with the liquid stream in the jet pump and thereafter the stream from the jet pump is re-deposited in the sump.

4. The invention of claim 3 wherein,
   said valve means is comprised of a pressure activated spool variant of a valve.

5. A metal halogen battery construction, with the improved combination comprising,
   at least one cell having a positive electrode and a negative electrode for contact with aqueous electrolyte containing the material of said metal and halogen,
   sump means wherein the electrolyte is collected,
   store means wherein halogen hydrate is formed and stored as part of an aqueous material,
   circulation means for transmitting electrolyte through the battery,
   conduit means for transmitting halogen gas formed in the cell to hydrate forming means associated with the store means, and
   diaphragm valve means sensitive to gas pressure in the sump means whereby when sump pressure drops below a desired setting of said valve means during a discharge of the battery, the valve opens and permits halogen gas from the store to be transmitted to the electrolyte circulation means.

6. The invention of claim 5 wherein,
   said battery is a zinc-chlorine battery using an aqueous zinc-chloride electrolyte.

7. The invention of claim 6 wherein,
   said valve means is comprised of a pressure activated spool valve.

8. A metal halogen battery construction, with the improved combination comprising,
   at least one cell having a positive electrode and a negative electrode for contact with aqueous electrolyte containing the material of said metal and halogen,
   sump means wherein the electrolyte is collected,
   store means wherein halogen hydrate is formed and stored as part of an aqueous material,
   circulation means for transmitting electrolyte through the battery,
   conduit means for transmitting halogen gas formed in the cell to hydrate forming means associated with the store means,
   fluid jet pump means operative to cause circulation of gases from the sump including hydrogen and halogen to contact a reactor means whereby hydrogen and halogen are combined and returned to the sump, and
   valve means sensitive to gas pressure in the sump means whereby when sump pressure drops below a desired setting of said valve means, the valve opens and permits halogen gas from the store to be transmitted to the electrolyte circulation means.

9. The invention of claim 8 wherein,
   said valve means is comprised of a pressure activated spool valve.

10. The invention of claim 8 wherein,
    said battery is a zinc-chlorine battery using an aqueous zinc-chloride electrolyte.

* * * * *